United States Patent
Suri

(10) Patent No.: US 9,687,816 B2
(45) Date of Patent: Jun. 27, 2017

(54) METHOD OF REGENERATION OF BETA-CYCLODEXTRIN BASED ADSORBENT-COATED SILICA WITH OZONE

(71) Applicant: Temple University-Of The Commonwealth System of Higher Education, Philadelphia, PA (US)

(72) Inventor: Rominder P. S. Suri, Audubon, PA (US)

(73) Assignee: Temple University—Of The Commonwealth System of Higher Education, Philadelphia, PA (US)

( * ) Notice: Subject to any disclaimer, the term of this patent is extended or adjusted under 35 U.S.C. 154(b) by 0 days.

(21) Appl. No.: 15/121,593

(22) PCT Filed: Feb. 27, 2015

(86) PCT No.: PCT/US2015/018050
§ 371 (c)(1),
(2) Date: Aug. 25, 2016

(87) PCT Pub. No.: WO2015/131066
PCT Pub. Date: Sep. 3, 2015

(65) Prior Publication Data
US 2016/0367967 A1     Dec. 22, 2016

Related U.S. Application Data

(60) Provisional application No. 61/946,089, filed on Feb. 28, 2014.

(51) Int. Cl.
| | |
|---|---|
| *B01J 38/12* | (2006.01) |
| *B01J 20/34* | (2006.01) |
| *C02F 1/28* | (2006.01) |
| *B01J 20/32* | (2006.01) |
| *C02F 101/30* | (2006.01) |
| *C02F 101/34* | (2006.01) |
| *C02F 101/36* | (2006.01) |

(52) U.S. Cl.
CPC ....... *B01J 20/3458* (2013.01); *B01J 20/3204* (2013.01); *B01J 20/3274* (2013.01); *B01J 20/3425* (2013.01); *C02F 1/281* (2013.01); *C02F 1/285* (2013.01); *C02F 1/288* (2013.01); *C02F 2101/305* (2013.01); *C02F 2101/345* (2013.01); *C02F 2101/36* (2013.01); *C02F 2303/16* (2013.01)

(58) Field of Classification Search
CPC ................................. B01J 38/12; B01J 29/90
USPC ....................................................... 502/38, 56
See application file for complete search history.

(56) References Cited

FOREIGN PATENT DOCUMENTS

WO    WO 2013/059285 A1 *  4/2013   ............. B32B 27/00

OTHER PUBLICATIONS

Alvarez et al., (2009) "A comparison between catalytic ozonation and activated carbon adsorption/ozone-regeneration processes for wastewater treatment", Applied Catalysis B: Environmental, vol. 92, pp. 393-400.

* cited by examiner

*Primary Examiner* — Edward Johnson
(74) *Attorney, Agent, or Firm* — Riverside Law LLP

(57) ABSTRACT

The present invention relates to systems and methods for regenerating β-cyclodextrin (β-CD) adsorbent after it has been used in a water decontamination process. The regeneration process of the present invention is based on treating β-CD with ozone gas, i.e., ozonation. In one embodiment, the regeneration process of the present invention comprises the steps of providing a β-CD adsorbent that has been used in a water decontamination process and removing at least a portion of the contaminants from the β-CD adsorbent by contacting the contaminants bound to the β-CD adsorbent with a gas comprising ozone.

23 Claims, 4 Drawing Sheets

METHOD OF REGENERATION OF BETA-CYCLODEXTRIN BASED ADSORBENT-COATED SILICA WITH OZONE

CROSS-REFERENCE TO RELATED APPLICATIONS

This application is the U.S. national phase application filed under 35 U.S.C. §371 claiming benefit to International Patent Application No. PCT/US15/18050, filed Feb. 27, 2015, which is entitled to priority under 35 U.S.C. §119(e) to U.S. Provisional Patent Application No. 61/946,089, filed Feb. 28, 2014, each of which application is hereby incorporated herein by reference in its entirety.

STATEMENT REGARDING FEDERALLY SPONSORED RESEARCH OR DEVELOPMENT

This invention was made with government support under Grant No. 1127786 awarded by National Science Foundation. The government has certain rights in the invention.

BACKGROUND OF THE INVENTION

The most commonly used adsorbent for water contaminants is granular activated carbon (GAC). After it is used in a water treatment process, the GAC having adsorbed contaminants is either discarded or reactivated by heating the GAC to high temperatures. However, regenerating or reactivating GAC is an expensive process because of the energy costs involved in heating. Similarly, discarding used GAC is not desirable from an environmental perspective, and replacing the GAC that is discarded can be expensive. In addition, there are costs and liability associated with the transport of used GAC.

The property of cyclodextrins to form inclusion complexes with various molecules through host-guest interactions (Caliman et al., 2009, Clean 37(4-5), 277-303) has made them useful compounds for the removal of a number of contaminants from water and wastewater (Yamasaki et al., 2006, J Chem Technol Biotechnol, 2006, 81:1271-1276; Mhlanga et al., 2007, J Chem Technol Biotechnol 82:382-388; Yamasaki et al., 2008, J Chem Technol Biotechnol 83:991-997; Zhao et al., 2009, J Inclusion Phenomena Macrocylic Chem 63: 195-201). The formation of inclusion complexes with bisphenol A (BPA) has been reported in solution phase (Liu et al., 2008, Carbohydrate Research 343(14):2439-2442), and in solid phase by using (β-cyclodextrin-polymer (Wang et al., 2006, Sensors and Actuators B 114:565-572). The commonly available types of cyclodextrins are α-cyclodextrin, (β-cyclodextrin, and γ-cyclodextrin, which consist of six, seven and eight α-1,4 linked D(C)-glucopyranose units, respectively (Crini, 2005, Prog. Polym. Sci. 30 38-70). The presence of hydroxyl groups at position 2, 3, and 6 in the glucose unit can be used for structural modifications of cyclodextrins (Khan et al., 1998, Chem. Rev. 98, 1977-1996) in order to obtain insoluble derivatives of cyclodextrins (Sugiura et al., 1989, Bulletin of the Chemical Society of Japan 62(5):1643-1651; Crini, 2003, Bioresource Technology 90(2); 193-198; Girek et al., 2005, Carbohydrate Polymers 59(2):211-215; Yamasaki et al., 2008, J Chem Technol Biotechnol 83:991-997), and to immobilize them onto inorganic supports such as silica (Armstrong, 1985, U.S. Pat. No. 4,539,399; Crini et al., 1995, Chromatographia 40(5-6):296-302; Phan et al., 1999, Physical Chemistry Chemical Physics 1 (22):5189-5195; Crini et al., 1999, Chromatographia 50 (11-12):661-669; Morcellet et al., 2000, J of Inclusion Phenomena and Macrocyclic Chemistry 38 (1-4): 345-359; Phan et al., 2002, Reactive & Functional Polymers 52:117-125; Carbonnier et al., 2003, E-Polymers, article no. 004; Ponchel et al. Microporous and Mesoporous Materials 75(3):261-272 (2004), Saikia et al., 2008, Colloids and Surfaces A: Physicochemical and Engineering Aspects 329(3):177-183). The chemically bonded organic-inorganic particles combine the advantageous properties of both inorganic support (excellent mechanical strength) and bonded organic compounds (high efficiency, reproducibility, and selectivity) (Carbonnier et al., 2004, J. of Appl. Polym. Sci. 90:1419-1426).

The use of silica particles coated with (β-cyclodextrin ((β-CD) polymer for the removal of contaminants from water is described by Suri and Bhattarai (International Patent Pub. No. WO 2013/059285, which is hereby incorporated by reference in its entirety). In Suri and Bhattari, the adsorbent β-CD-coated particles can be packed in a column or bed, wherein water is allowed to flow through the column so that contaminants are adsorbed onto the β-CD adsorbent particles. Alternatively, β-CD-coated particles can be mixed with stationary water, i.e., water in a tank wherein the mixture of water and β-CD-coated particles is stirred to remove contaminants from the water. After the capacity of the β-CD-coated particles to adsorb contaminants is reached, the particles can be regenerated by treating them with an organic solvent such as methanol (see Suri and Bhattari at para [0058]). However, the use of organic solvent for regenerating β-CD adsorbent creates the need for treating or disposing of the organic solvent after the regeneration process.

Thus, there is a continuing need for a method of regenerating β-CD adsorbent after the β-CD has been used for decontaminating water. The present invention addresses this continuing need in the art.

SUMMARY OF INVENTION

The present invention relates to systems and methods for regenerating β-cyclodextrin (β-CD) for reuse in a water treatment process. In one embodiment, the method of the present invention comprises the steps of: providing a β-CD adsorbent, wherein at least a portion of the surface of said β-CD adsorbent comprises one or more contaminants, and removing at least a portion of said one or more contaminants from said β-CD adsorbent by contacting said one or more contaminants with ozone gas. In another embodiment, the present invention is a method for regenerating β-cyclodextrin (β-CD) contained in a water treatment column for reuse in a water treatment process, comprising the steps of: providing a column having a compartment and an inlet, wherein said compartment contains a plurality of β-CD adsorbent particles, and wherein at least a portion of the surface of the plurality of particles comprises one or more contaminants; and adding ozone gas through said column inlet into said compartment, wherein said ozone gas contacts the surface of the plurality of β-CD adsorbent particles in said compartment, thereby removing at least a portion of said one or more contaminants from said β-CD adsorbent particles. In yet another embodiment, the present invention is a method for regenerating β-cyclodextrin (β-CD) contained in a water treatment vessel, comprising the steps of: providing a water treatment vessel containing water and a plurality of β-CD adsorbent particles, wherein said β-CD adsorbent particles comprise one or more contaminants; and adding ozone gas to said vessel, wherein said ozone gas contacts the surface of the β-CD adsorbent particles thereby removing at least a portion of said one or more contaminants from said β-CD adsorbent particles.

In various embodiments, the β-CD adsorbent can be any adsorbent material comprising β-CD. In one embodiment, the β-CD adsorbent is a silica particle coated with β-CD polymer.

In various embodiments, the one or more contaminant adsorbed onto the β-CD adsorbent can be any type of organic compound. In one embodiment, the one or more contaminants is a phenol, for example bisphenol A (BPA). In one embodiment, the one or more contaminants is a steroid hormone, for example an estrogen, a progestrogen, or a testosterone. In one embodiment, the steroid hormone is selected from the group consisting of 17β estradiol 17α-ethynylestradiol, estriol, 17α-estradiol, trimegestrone, estrone, 17α-dihydroequilin, medrogestone, progesterone, gestodene, norgestrel, equilin, desogestrel, and etonorgestrel. In one embodiment, the one or more contaminants is a perfluoro compound. In one embodiment, the perfluoro compound is selected from the group consisting of tridecafluorononanoic acid, perfluoroheptanoic acid, undecafluorohexanoic acid, perfluorodecanoic acid, heptafluorooctane salt and perfluorooctanoic acid (PFOA).

The systems and methods of the present invention can regenerate the adsorbent capacity of a β-CD adsorbent to any capacity that would be suitable for reuse in a water treatment process. In one embodiment, at least 50% of the adsorbent capacity of the β-CD adsorbent is regenerated after contacting said contaminants with ozone gas. In one embodiment, at least 50% of the surface area of the β-CD adsorbent is regenerated, i.e., free of contaminants, after contacting said contaminants with ozone gas.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1A and FIG. 1B, is a set of schematic diagrams of an exemplary embodiment of a batch water treatment system during water treatment (FIG. 1A) and during regeneration of β-CD (FIG. 1B).

DETAILED DESCRIPTION

Figure 1:
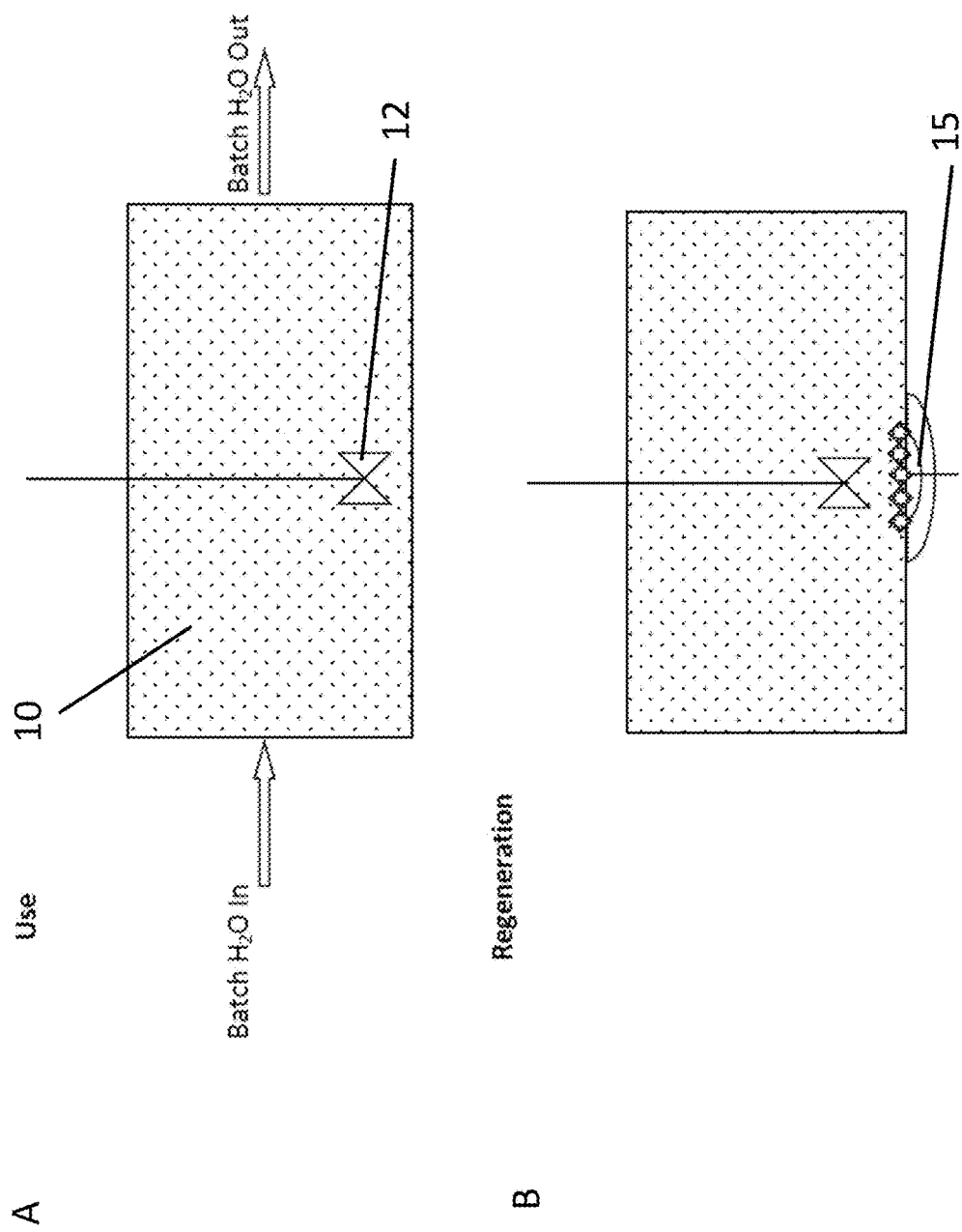
FIG. 1, comprising

It is to be understood that the figures and descriptions of the present invention have been simplified to illustrate elements that are relevant for a clear understanding of the present invention, while eliminating, for the purpose of clarity, many other elements found in the art related to ozonation, water treatment, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "β-CD," "β-CD adsorbent," "β-CD adsorbent particle," "β-CD adsorbent media," "β-CD coating," and the like are used interchangeably herein, and refer to any composition comprising β-CD, a β-CD-polymer, or a β-CD derivative that is useful in a decontamination process, preferably a water treatment process. In a preferred embodiment, the composition is a β-CD adsorbent particle comprising silica coated with β-CD polymer.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

DESCRIPTION

The present invention relates to systems and methods for regenerating β-CD adsorbent after it has been used in a water decontamination process. The regeneration process of the present invention is based on treating β-CD with ozone gas. Used β-CD adsorbent can be regenerated and reused for many treatment cycles through this ozonation process. The method of the present invention is more environmentally-friendly and less expensive than high temperature GAC reactivation.

The process of the present invention is based on the discovery that contacting β-CD adsorbent with ozone gas ($O_3$), i.e., ozonation, will regenerate β-CD adsorbent by reacting with the contaminants adsorbed onto the β-CD adsorbent. This reaction causes the contaminants to be degraded and released from the β-CD adsorbent, thereby increasing the surface area of the β-CD adsorbent that is available for use in a water decontamination process. In one embodiment, the regeneration process of the present invention comprises the steps of providing a β-CD adsorbent that has been used in a water decontamination process and removing at least a portion of the contaminants from the β-CD adsorbent by contacting the contaminants bound to the β-CD adsorbent with a gas comprising ozone.

In one embodiment, the method of regenerating β-CD adsorbent of the present invention is a batch process, i.e., a non-continuous process. Referring now to FIG. 1A, in such an embodiment, a tank or vessel 10 is filled with contaminated water and the β-CD adsorbent media is added. The contents of the tank are mixed or agitated for a period of time using an impeller or other suitable device 12, until the water is decontaminated to the desired level. In one embodiment, the level of decontamination can be determined by sampling the contents of the tank and testing the contents of the water using any method suitable for determining the concentration of one or more contaminants in the water. In another embodiment, the period of time for mixing the contents of the tank can be a pre-determined time period which is based on data from experiments or previous batches, or it can be based on theoretical calculations, as would be understood by a person of skill in the art.

After the water is determined to be sufficiently decontaminated, the mixing is stopped to allow for the β-CD adsorbent to settle to the bottom of the tank, and a portion of the treated, i.e., clean, water is then removed from the tank, for example via a pump or by decanting. In one embodiment, the portion of treated water removed is in the range of 20-50% of the tank's contents. However, the portion of water removed is not limited to any amount specified herein, and can be any amount that would leave a sufficient amount of water remaining in the tank to perform the next steps of the process. Once a portion of the water is removed, the mixing or agitation is restarted and a gas comprising ozone is injected into the tank. It is contemplated herein that the ozone-containing gas useful for the method of the present invention can contain other components, for example nitrogen, and can have any suitable concentration of ozone as would be understood by a person skilled in the art. Referring to FIG. 1B, ozone may be added using any device 15 known in the art, for example via bubble diffusers placed inside the tank or via an in-line venturi injector. The ozone is added until the β-CD adsorbent is sufficiently regenerated.

In one embodiment, the β-CD is sufficiently regenerated when about 50-100% of the surface area of the β-CD adsorbent has been decontaminated. The surface area referred to herein includes both the external surface area and the internal surface area of the β-CD adsorbent, i.e., the surface area of any cavities in the β-CD adsorbent that can come in contact with water being treated in a water treatment process. The decontaminated surface area of the β-CD adsorbent is then available to receive and bind contaminants in another water treatment process. In one embodiment, the β-CD is sufficiently regenerated when the adsorption capacity of the β-CD adsorbent is returned to 50-100% of virgin β-CD adsorption capacity. The adsorption capacity of β-CD of a specific contaminant is typically at least 100 µg/g. For example, the adsorption capacity of virgin β-CD is typically about 140 µg/g for bisphenol A, and typically about 200 µg/g for 17β estradiol. The ozonation process of the present invention can typically regenerate the adsorption capacity of β-CD to about 120 µg/g or more for bisphenol A (~86% of virgin β-CD capacity), and about 175 µg/g or more for 17β-estradiol (~88% of virgin capacity).

The adsorption capacity of the β-CD adsorbent can be dependent on the concentration of a given contaminant in the contaminated water. In some embodiments, the adsorption capacity of the β-CD adsorbent for a compound of interest can be very low and still be useful for decontaminating water. For example, contaminant concentrations in water can be on the scale of nanograms per liter. Accordingly, in such an example, the adsorption capacity of the β-CD adsorbent can be relatively low and still provide adequate decontamination capacity. Therefore, the β-CD adsorbent may only need to be regenerated to an adsorption capacity of, for example, 10 ng/g, 100 ng/g, or 250 ng/g, to be useful for a water treatment process.

However, the determination that β-CD adsorbent has been sufficiently regenerated using the process of the present invention can be based on any criteria and is not limited to the specific values of surface area and adsorption capacity listed herein. For example, the contact time of β-CD adsorbent with ozone can be performed based on any type analytical testing of the β-CD adsorbent to measure the contamination level, or the ozone contact time can be based on data from previous regeneration processes, or on theoretical calculations.

In another embodiment of a batch process, the β-CD adsorbent particles can be removed from the tank via filtration prior to being contacted with ozone. In such an embodiment, the β-CD adsorbent particles can then be treated with ozone in the filter until the β-CD adsorbent in sufficiently regenerated. Then, the β-CD adsorbent can be used in another water treatment process.

The parameters of the ozonation process of the present invention can be set based on experimental data, previous batch data, or theoretical calculation. Parameters of the ozonation step that can be adjusted to provide the optimal decontamination and regeneration of the β-CD adsorbent include, but are not limited to: the flow rate of ozone gas added to the tank; the concentration of ozone in the ozone feed gas added to the tank; the temperature of the ozone gas and/or temperature of the tank contents; the pressure of the tank contents; the time of ozone addition; the stir rate of the tank contents, e.g., impeller speed; the size and/or geometry of the tank; the size and/or geometry of the ozone gas addition device; the relative loading of β-CD adsorbent in the batch; and the characteristics of the β-CD adsorbent particles, for example the relative surface area of β-CD adsorbent in the batch. In one embodiment, the β-CD adsorbent can be tested to confirm that it has been sufficiently regenerated before the adsorbent is used in another water treatment process.

Figure 2:
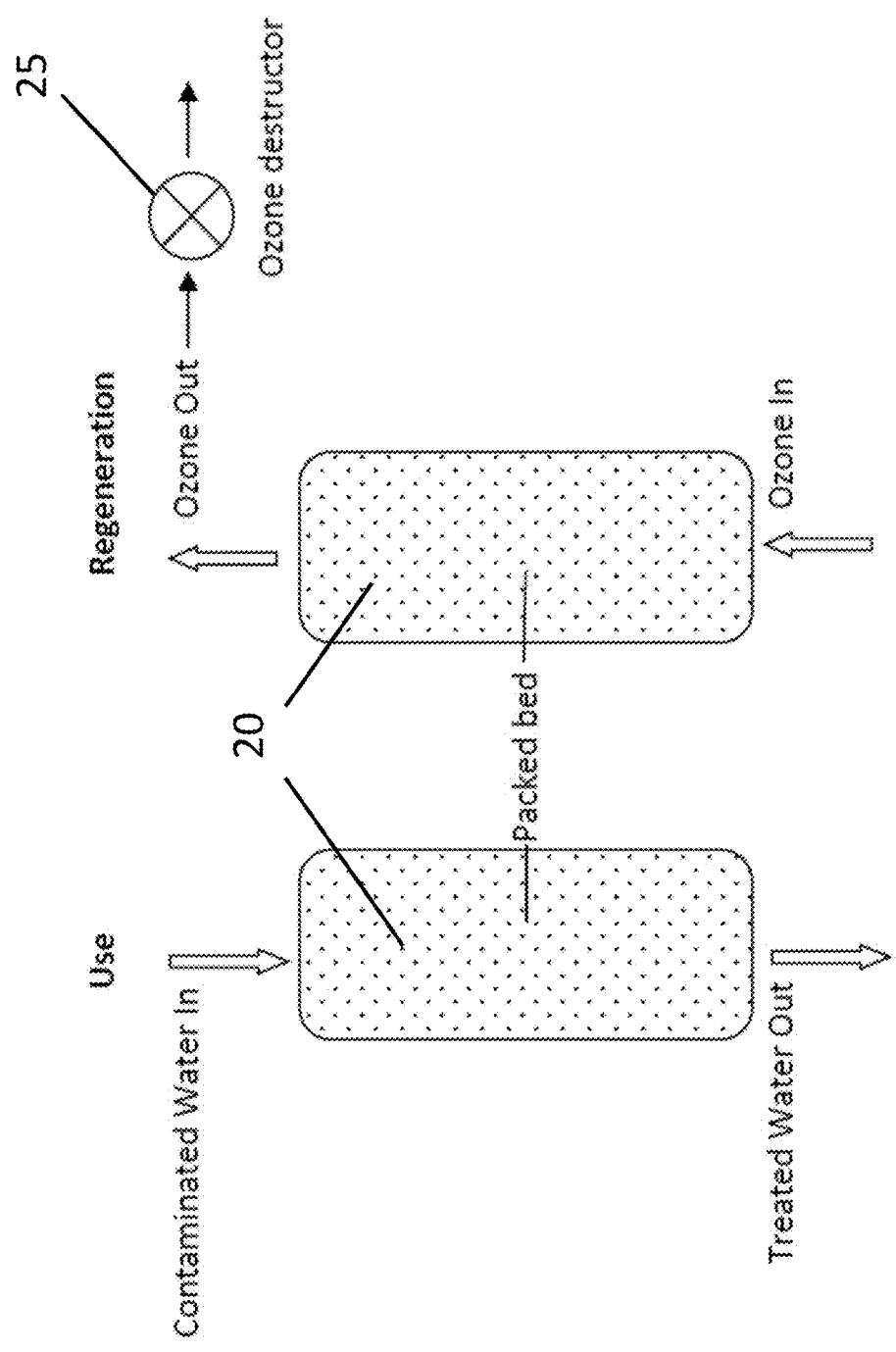
FIG. 2 is a set of schematic diagrams of an exemplary embodiment of a continuous water treatment system during both water treatment operation and regeneration of β-CD.

In one embodiment, the method of regenerating β-CD adsorbent of the present invention is a continuous process, i.e., using a continuous flow system. Referring now to FIG. 2, in such an embodiment, the process of the present invention utilizes a column or packed bed 20. Column 20 is packed with β-CD adsorbent and contaminated water is pumped or drained through column 20 to remove the contaminants from the water. In a continuous flow process, various parameters can be set or adjusted to ensure that the water entering column 20 is sufficiently decontaminated prior to exiting the column. For example, the parameters can include, but are not limited to: the characteristics of the β-CD adsorbent particles, e.g., relative surface area; the density of packing of β-CD adsorbent particles in the column; the length of the column; the cross-sectional area and/or geometry of the column; the flow rate, i.e., residence time of water flowing through the column; and the temperature of the column and/or the water entering the column.

The column can be used to decontaminate water until the treatment objective is reached. The treatment objective is the acceptable contaminant concentration in the effluent from the column. In some cases, it may be desirable to operate the column until the β-CD adsorbent packing in the column gets saturated with contaminants. Once the β-CD adsorbent is sufficiently saturated, i.e., there is not a sufficient amount of available β-CD surface area remaining in the column for effective water treatment, the flow of water through the column is stopped and the regeneration process of the present invention can be performed. Alternatively, the regeneration process can be started when the β-CD adsorbent is less than fully saturated with contaminants, for example when the treatment objective has been reached and the β-CD adsorbent is only partially saturated.

In one embodiment, the regeneration process for a continuous flow column is performed via the following steps. A gas comprising ozone is injected into the column via any device known in the art. For example, ozone can be injected to the column via a diffuser or venturi injector system. If a venturi system is used, the venturi system will generally require water flow, preferably clean water flow, through the column to cause ozone to be pulled into the column. Ozone will flow through the column, thereby regenerating the β-CD adsorbent present in the packed bed. Any excess ozone, i.e., unreacted ozone, can be passed through an ozone destructor 25, for example a thermal or catalytic unit, once it exits the column. Similarly to the batch process described herein, the ozone passed through the column will destroy most or all of the contaminants adsorbed onto the β-CD adsorbent, thereby regenerating the adsorbent for additional water treatment cycles.

The parameters of the ozonation step of the continuous flow process of the present invention can be set based on experimental data, previous batch data, or theoretical calculation. Parameters of the ozonation step that can be adjusted to provide the optimal decontamination of the β-CD adsorbent include, but are not limited to: the flow rate of ozone gas through the column; the concentration of ozone in the ozone feed gas; the temperature of the ozone gas and/or temperature of the column during ozonation; the pressure in the column; the time of ozone addition; and the size and/or geometry of the column.

Examples of ranges for either the batch or continuous regeneration process of the present invention are: about 1 to 200 L/min for the ozone flow rate; about 0.5 to 100 mg/L for ozone concentration; about 20° C. to 200° C. for the ozone temperature, temperature of the tank contents, or column temperature; about 1 to 4 atm for the pressure in the tank or column; and a contact time, i.e., ozonation time of about 10 min to 48 hours. However, the ranges for the parameters of the regeneration process of the present invention are not limited to the values listed herein, and can be any value as would be understood by a person skilled in the art.

The methods of the present invention can be used to regenerate any form of β-CD or β-CD derivative that has been used in a decontamination process. In one embodiment, the β-CD is in the form of a coating on a particle suitable for receiving a β-CD coating. In one embodiment, the β-CD used for coating the particle is a β-CD polymer. In one embodiment, the β-CD is in the form of a β-CD polymer coating on a silica particle. In such an embodiment, the β-CD can be modified with a functional group and then reacted with a silica particle, wherein the silica particle is attached to the β-CD via a chemical bond to the functional group on the surface of the β-CD. The β-CD can be functionalized or silanized by reaction with a compound such as glycidoxypropyl trimethoxysilane (GPTS) or aminopropyl triethoxysilane (APTES). The size of the silica particles coated with β-CD polymer can range in size from about US sieve size 10 to about 200. In a preferred embodiment, the method of the present invention can be used to regenerate any of the β-CD compositions that are described in Suri and Bhattarai (International Patent Pub. No. WO 2013/059285). However, the methods of the present invention are not limited to the β-CD compositions described in Suri and Bhattarai.

Further, the regeneration methods of the present invention can be used to remove any type of contaminant from the surface of β-CD, β-CD-polymer, or β-CD derivative. Examples of contaminants that can be degraded or treated using the methods of the present invention include, but are not limited to: a phenol, for example bisphenol A (BPA); a steroid hormone, for example, estrogen, progesterone, testosterone, 17β estradiol 17α-ethynylestradiol, estriol, 17α-estradiol, trimegestrone, estrone, 17α-dihydroequilin, medrogestone, progesterone, gestodone, norgestrel, equilin, desogestrel, or etonorgestrel; or a perfluoro compound, for example tridecafluorononanoic acid, perfluoroheptanoic acid, undecafluorohexanoic acid, perfluorodecanoic acid, heptafluorooctane salt or perfluorooctanoic acid (PFOA). However, the regeneration methods of the present invention are not limited to the specific contaminants listed herein, and can be used for any type of contaminant that can bind to, or be trapped by, β-CD.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1

Regeneration of β-CD Adsorbent

Figure 3:
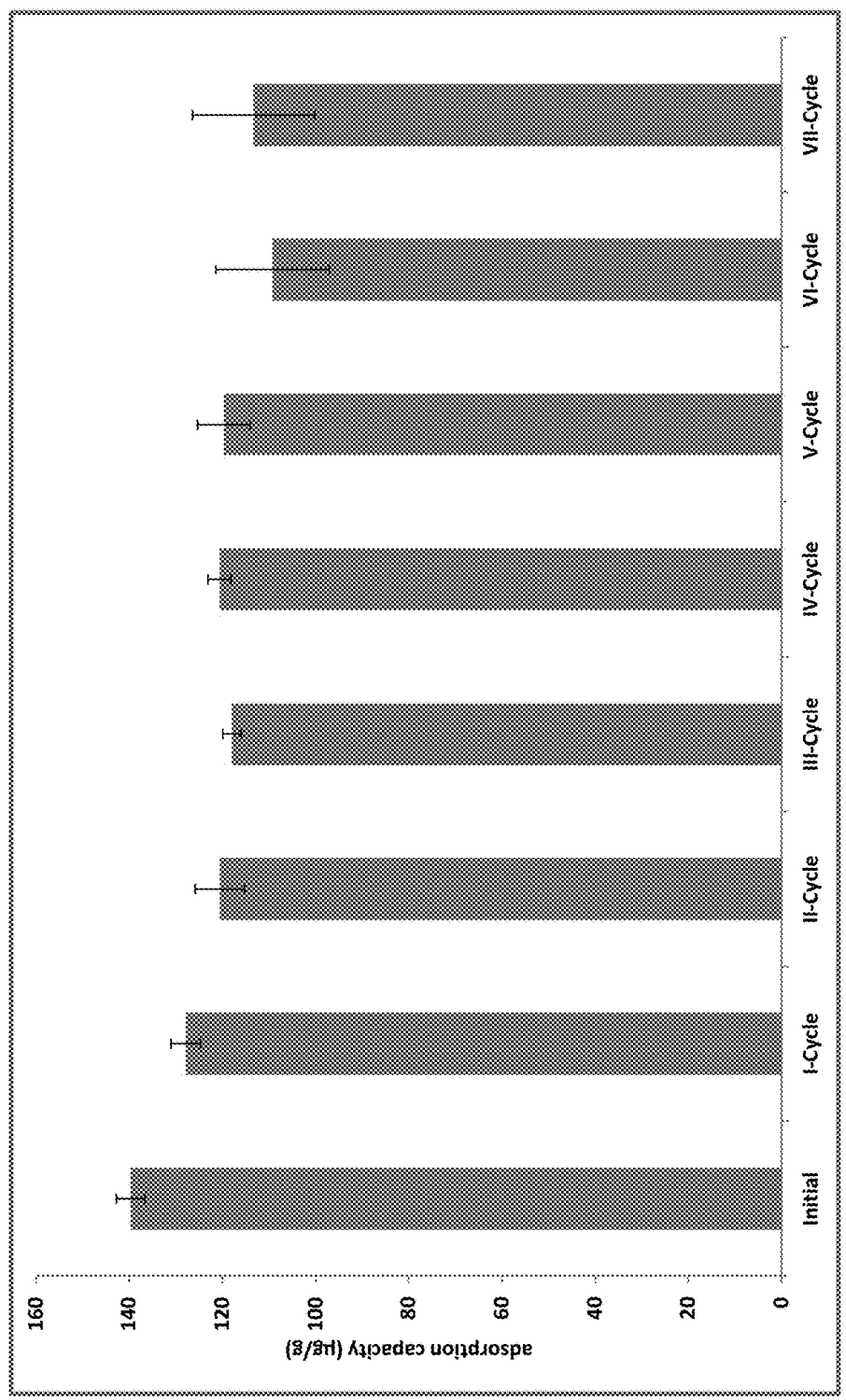
FIG. 3 is a graph showing data for the regeneration of β-CD coated silica with ozonation for the removal of BPA in triplicates [intial conc: 200 m/L; adsorbent dosage: 1.0 g/L; intial pH: 6.2-7.1; Ozonation at 1 wt % and 20 L/hr for 2 hr].
Figure 4:
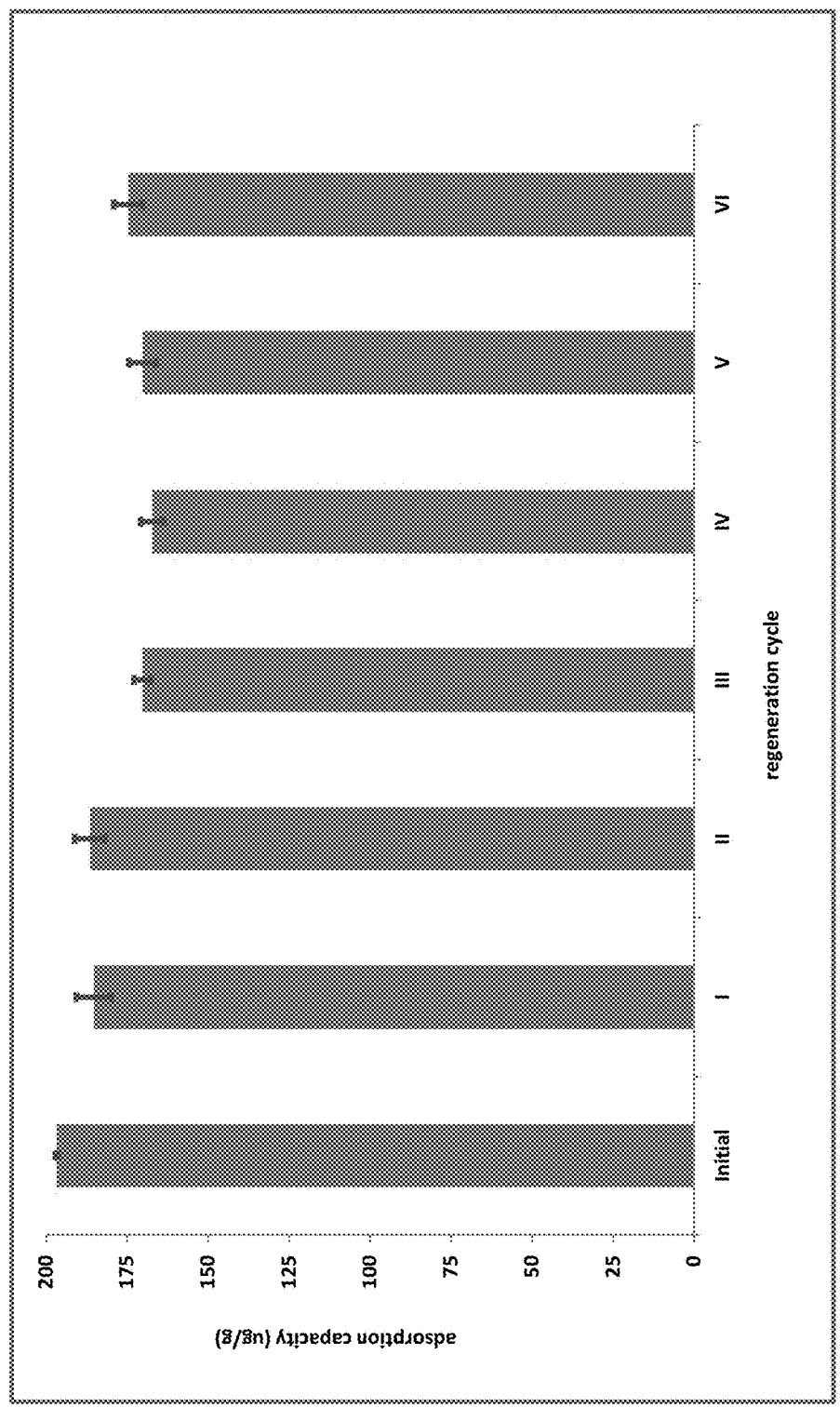
FIG. 4 is a graph showing data for the regeneration of β-CD coated silica with ozonation for the removal of 17β estradiol in triplicates [intial conc: 200 m/L; adsorbent dosage: 1.0 g/L; intial pH: 6.3-7.0; Ozonation at 1 wt % and 20 L/hr for 2 hr].

The adsorbent, β-CD-coated silica, was produced using the methods described in Suri and Bhattarai (International Patent Pub. No. WO 2013/059285). In order to demonstrate the regeneration process with ozone, the β-CD was saturated with contaminants, specifically 17β-estradiol or bisphenol-A (BPA). To saturate the adsorbent, 900 ml of the respective contaminant at an initial concentration of 200 µg/L was mixed with 0.9 g of adsorbent and left on a shaker at 160 rpm for 48 hours. After saturation, the adsorbent was transferred into a glass reactor filled with 2 L of DI water and ozone was passed through the reactor at 1% (w/w) and flow rate of approximately 20 L/hr for 2 hr (Wedeco ozone generator). After ozonation, the adsorbent was separated from the solution, washed three times with DI water and used for another batch of adsorption under the same experimental conditions. The adsorption capacity of the adsorbent from each batch experiment was calculated and the results are shown in FIGS. 3 and 4. The results showed successful regeneration of the adsorbent by destroying the contaminant (trapped in the cavity of β-CD) with ozone over seven successive cycles. It was also observed that the adsorbent showed a slight decrease in its adsorption capacity in first cycle, however, it continued to remove the target contaminant in later use with nearly the same efficiency as previous uses (see FIGS. 3 and 4).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method for regenerating β-cyclodextrin ((β-CD) for reuse in a water treatment process, comprising:
    providing a β-CD adsorbent, wherein at least a portion of the surface of said β-CD adsorbent comprises one or more contaminants, and
    removing at least a portion of said one or more contaminants from said β-CD adsorbent by contacting said one or more contaminants with ozone gas.

2. The method of claim 1, wherein the β-CD adsorbent is a silica particle coated with β-CD polymer.

3. The method of claim 1, wherein the one or more contaminants is an organic compound.

4. The method of claim 1, wherein said one or more contaminants is a phenol.

5. The method of claim 4, wherein said phenol is bisphenol A (BPA).

6. The method of claim 1, wherein said one or more contaminants is a steroid hormone.

7. The method of claim 6, wherein said steroid hormone is an estrogen, a progestrogen, or a testosterone.

8. The method of claim 7, wherein said steroid hormone is selected from the group consisting of 17β-estradiol 17α-ethynylestradiol, estriol, 17α-estradiol, trimegestrone, estrone, 17α-dihydroequilin, medrogestone, progesterone, gestodone, norgestrel, equilin, desogestrel, and etonorgestrel.

9. The method of claim 1, wherein said one or more contaminants is a perfluoro compound.

10. The method of claim 9, wherein said perfluoro compound is selected from the group consisting of tridecafluorononanoic acid, perfluoroheptanoic acid, undecafluorohexanoic acid, perfluorodecanoic acid, heptafluorooctane salt and perfluorooctanoic acid (PFOA).

11. The method of claim 1, wherein at least 50% of the adsorbent capacity of the β-CD adsorbent is regenerated after contacting said contaminants with ozone gas.

12. A method for regenerating β-cyclodextrin (β-CD) contained in a water treatment column for reuse in a water treatment process, comprising:
    providing a column having a compartment and an inlet, wherein said compartment contains a plurality of β-CD adsorbent particles, and wherein at least a portion of the surface of the plurality of particles comprises one or more contaminants; and
    adding ozone gas through said column inlet into said compartment, wherein said ozone gas contacts the surface of the plurality of β-CD adsorbent particles in said compartment, thereby removing at least a portion of said one or more contaminants from said β-CD adsorbent particles.

13. The method of claim 12, wherein the β-CD adsorbent particles are silica particles coated with β-CD polymer.

14. The method of claim 12, wherein the one or more contaminants is an organic compound.

15. The method of claim 12, wherein said one or more contaminants is a phenol.

16. The method of claim 15, wherein said phenol is bisphenol A (BPA).

17. The method of claim 12, wherein said one or more contaminants is a steroid hormone.

18. The method of claim 17, wherein said steroid hormone is an estrogen, a progestrogen, or a testosterone.

19. The method of claim 18, wherein said steroid hormone is selected from the group consisting of 17β-estradiol 17α-ethynylestradiol, estriol, 17α-estradiol, trimegestrone, estrone, 17α-dihydroequilin, medrogestone, progesterone, gestodone, norgestrel, equilin, desogestrel, and etonorgestrel.

20. The method of claim 12, wherein said one or more contaminants is a perfluoro compound.

21. The method of claim 20, wherein said perfluoro compound is selected from the group consisting of tridecafluorononanoic acid, perfluoroheptanoic acid, undecafluorohexanoic acid, perfluorodecanoic acid, heptafluorooctane salt and perfluorooctanoic acid (PFOA).

22. The method of claim 12, wherein at least 50% of the adsorbent capacity of the β-CD adsorbent is regenerated after contacting the surface of the plurality of particles with ozone gas.

23. A method for regenerating β-cyclodextrin (β-CD) contained in a water treatment vessel, comprising:
    providing a water treatment vessel containing water and a plurality of β-CD adsorbent particles, wherein said β-CD adsorbent particles comprise one or more contaminants; and
    adding ozone gas to said vessel, wherein said ozone gas contacts the surface of the β-CD adsorbent particles thereby removing at least a portion of said one or more contaminants from said β-CD adsorbent particles.

* * * * *